United States Patent [19]

Christopherson et al.

[11] 4,306,408
[45] Dec. 22, 1981

[54] GRASS CATCHER ASSEMBLY

[75] Inventors: Herman P. Christopherson, Burnsville; William D. Wood, Maple Lake, both of Minn.

[73] Assignee: The Toro Company, S. Minneapolis, Minn.

[21] Appl. No.: 169,065

[22] Filed: Jul. 15, 1980

[51] Int. Cl.³ .................................................. A01D 53/06
[52] U.S. Cl. .......................................... 56/202; 56/205
[58] Field of Search ......................... 56/202, 205, 16.6

[56] References Cited

U.S. PATENT DOCUMENTS

| | | | |
|---|---|---|---|
| 2,983,095 | 5/1961 | Barth | 56/202 |
| 3,108,420 | 10/1963 | Gercke | 56/205 |
| 3,110,998 | 11/1963 | Goldberg et al. | 56/202 |
| 3,949,540 | 4/1976 | Christopherson et al. | 56/202 |
| 4,015,406 | 4/1977 | Witt et al. | 56/202 |
| 4,149,363 | 4/1979 | Woeiffer et al. | 56/202 |

FOREIGN PATENT DOCUMENTS 282007 3/1966 Australia ................................ 56/202

9774 4/1980 European Pat. Off. ............. 56/202

OTHER PUBLICATIONS

Mehr ErPols und mehr Freizeit im Garten, Wolf Co., Model TL 2000 Brochure, 1979, p. 6.
Toro Riding Mower Bagging Accessories", Easy Empty Grass Catcher, Model 59111, p. 2, lines 21–37.
Concord, "Der Rasenmahier fur hochste Anspruche".
La Nouvelle Tonte, Eurotondor Tractee, Outils Wolf.

*Primary Examiner*—Paul J. Hirsch
*Attorney, Agent, or Firm*—James W. Miller

[57] ABSTRACT

A grass catcher assembly (2) for use on a lawn mower comprises a flexible bag (4). The bag (4) includes an open front side (14) and an open top side (16). A cover (40) is pivotally secured to bag (4) adjacent the rear wall (12). Cover (40) includes a chute (50) that has a frictional engagement with a bag frame (38) for securing cover (40) in place. When cover (40) is pivoted upwardly, grass can be dumped from bag (4) through both the open front and top sides (14) and (16) when bag (4) is tipped forwardly.

5 Claims, 4 Drawing Figures

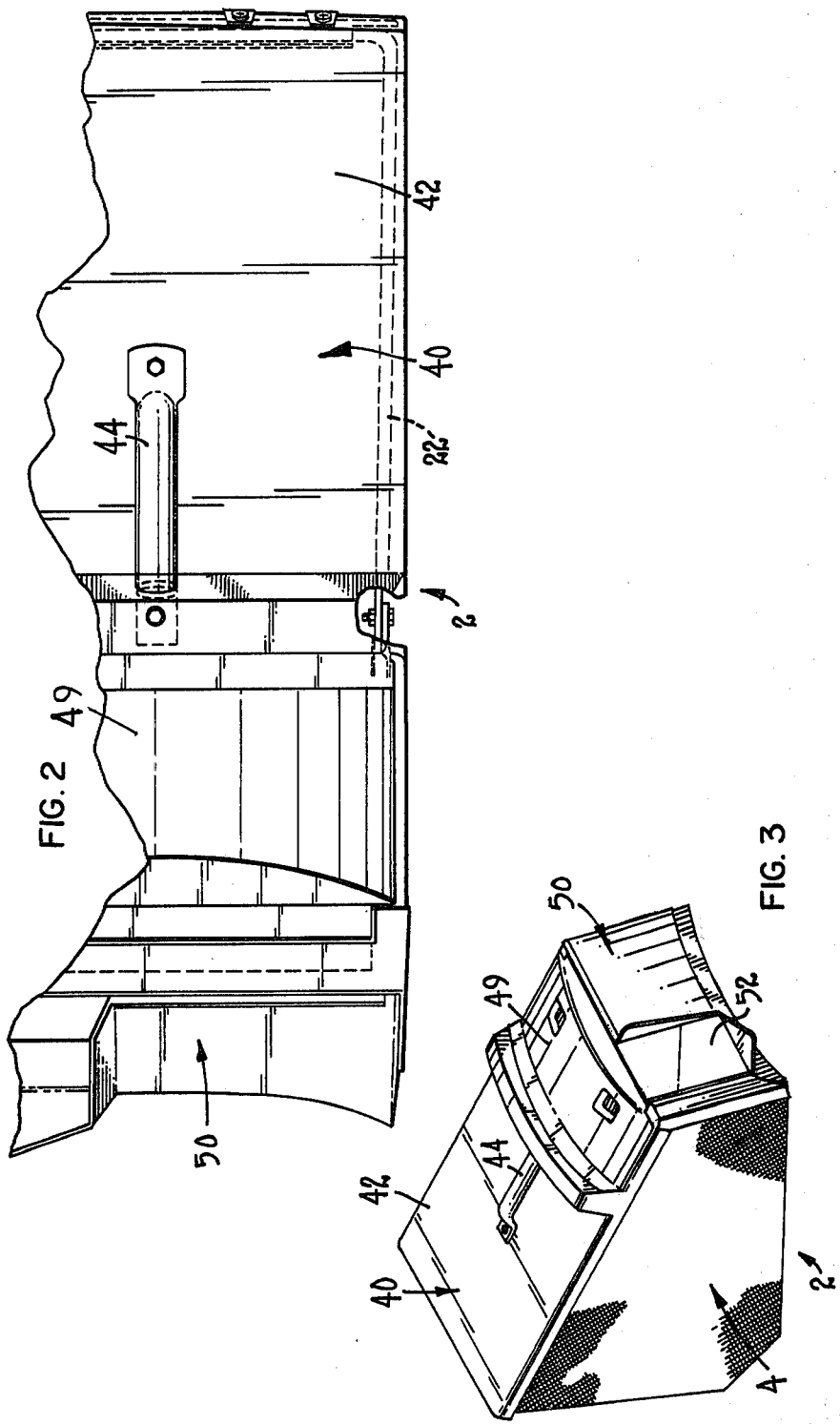

GRASS CATCHER ASSEMBLY

TECHNICAL FIELD

This invention relates to a grass catcher assembly for receiving and collecting cut grass particles or other cut vegetation particles. Such a grass catcher assembly is usable on powered lawn mowers of the walk-behind type or other lawn mowing implements.

BACKGROUND OF THE INVENTION

Powered lawn mowers are well-known. Such mowers usually comprise a wheeled deck or housing that contains a rotatable vegetation cutting element. This element may either be a rigid steel blade or a flexible mono-filament line. The cutting element, which is powered by any suitable prime mover, rotates in a substantially horizontal cutting plane. This action severs the grass particles at a pre-determined height above the ground dependent upon the height of the housing above the ground.

After the grass has been cut by the cutting element, the grass particles are normally entrained by an air flow generated in any suitable manner. This air flow sweeps the cut grass particles through the grass tunnel defined by the mower housing and out through a discharge port. Usually, some type of grass collecting means or receptacle is attached to the discharge port for catching the cut grass particles and preventing them from simply falling onto the lawn. This is desirable since many people do not wish to see the cut grass particles deposited on the lawn as they feel this is unsightly.

There are many types of different grass collecting receptacles which are known. Some of these simply comprise a flexible bag having an open front end which can be tied around the grass discharge chute and a rear end which is supported by a rod attached to the handle. Other receptacles comprise a combination of a rigid door that defines an inlet opening for the grass particles and a flexible bag which is attached to the door. After the bag is removed from the mower, the door can be pivoted to empty the bag.

One problem with the types of grass collecting receptacles just noted is the relatively small opening through which the grass is placed into the bag. This opening is also the same opening the operator must use to empty the bag. It can be relatively difficult and time consuming to empty the bag through such a small opening. The grass tends to clog in the opening requiring the operator to reach in with his hand and pull out the clogged portion. Accordingly, the use of a relatively small inlet opening in proportion to the volume of the bag is disadvantageous when trying to empty the bag.

There are certain types of grass collecting receptacles which exhibit a clamshell type of opening. Such receptacles usually have two rigid halves or containers which are pivotally connected together adjacent the inlet opening to the receptacle. A latch is provided on the rear side of these two portions to releasably clamp and hold the portions together.

After the grass is cut, the receptacle is removed from the mower housing. The latch is then released and the two halves open pivoting around the front axis adjacent the inlet opening. This dumps the grass out the rear of the receptacle. One clamshell type receptacle is marketed by the assignee of this invention for use on a riding mower, such as the type 832E, with the clamshell receptacle being known as the Easy-Empty ® grass catcher (Model 59111). Other manufacturers market similar types of clamshell grass receptacles.

While the clamshell grass receptacles noted above dump the cut grass particles through an opening larger than that of the inlet opening, they all utilize two relatively rigid halves or portions. Thus, they do not have the lightness of a receptacle which incorporates a flexible bag. Moreover, some type of latching means is required in all these devices to hold the two portions together. The addition of such a latch of course increases the cost of manufacturing such a receptacle. Furthermore, since these receptacles all dump the grass particles to the rear, none of them utilize the original inlet opening for dumping. This opening, while relatively small, is entirely wasted in the grass dumping operation.

SUMMARY OF THE INVENTION

This invention relates to a grass catcher assembly of the clamshell type which incorporates a flexible bag and which also utilizes the original grass inlet for grass dumping. In addition, the grass catcher assembly of this invention is less complex and expensive than the other clamshell receptacles of the prior art.

One aspect of this invention is a grass catcher assembly for use on a lawn mower that comprises a substantially flexible bag. The bag is enclosed except for an open front side and a generally contiguous open top side which are bounded by peripheral edges. A reinforcing means is secured to the peripheral edges which bound the open front and top sides of the bag. A cover encloses at least the open top side of the bag. Means is provided for pivotally mounting this cover element adjacent the rear wall of the bag such that the cover can be pivoted from a first position in which the cover closes the open top side of the bag to a second position in which the cover is pivoted upwardly in a clamshell manner. Thus, when the grass catcher assembly of this invention is removed from the lawn mower housing and the cover is pivoted upwardly, the bag can be tipped towards the front. The grass particles will be dumped out through both the open top side and the open front side to utilize both of these openings in emptying the grass catcher assembly.

Another aspect of this invention is a grass catcher assembly as noted above which does not incorporate any positive latching means for the cover. Instead, the cover includes a downwardly depending chute that normally closes the open front side of the bag. This chute is shaped to have a frictional fit with the front side of the bag for releasably retaining the cover thereon.

BRIEF DESCRIPTION OF THE DRAWINGS

This invention will be described in detail hereafter in the Detailed Description, when taken in conjunction with the following drawings, in which like referenced numerals refer to like elements throughout.

FIG. 2 is a partial top plan view of the improved grass catcher assembly shown in FIG. 1;

FIG. 3 is a perspective view of the improved grass catcher shown in FIG. 1, particularly illustrating the bag with the top cover closed;

DETAILED DESCRIPTION

Figure 1:
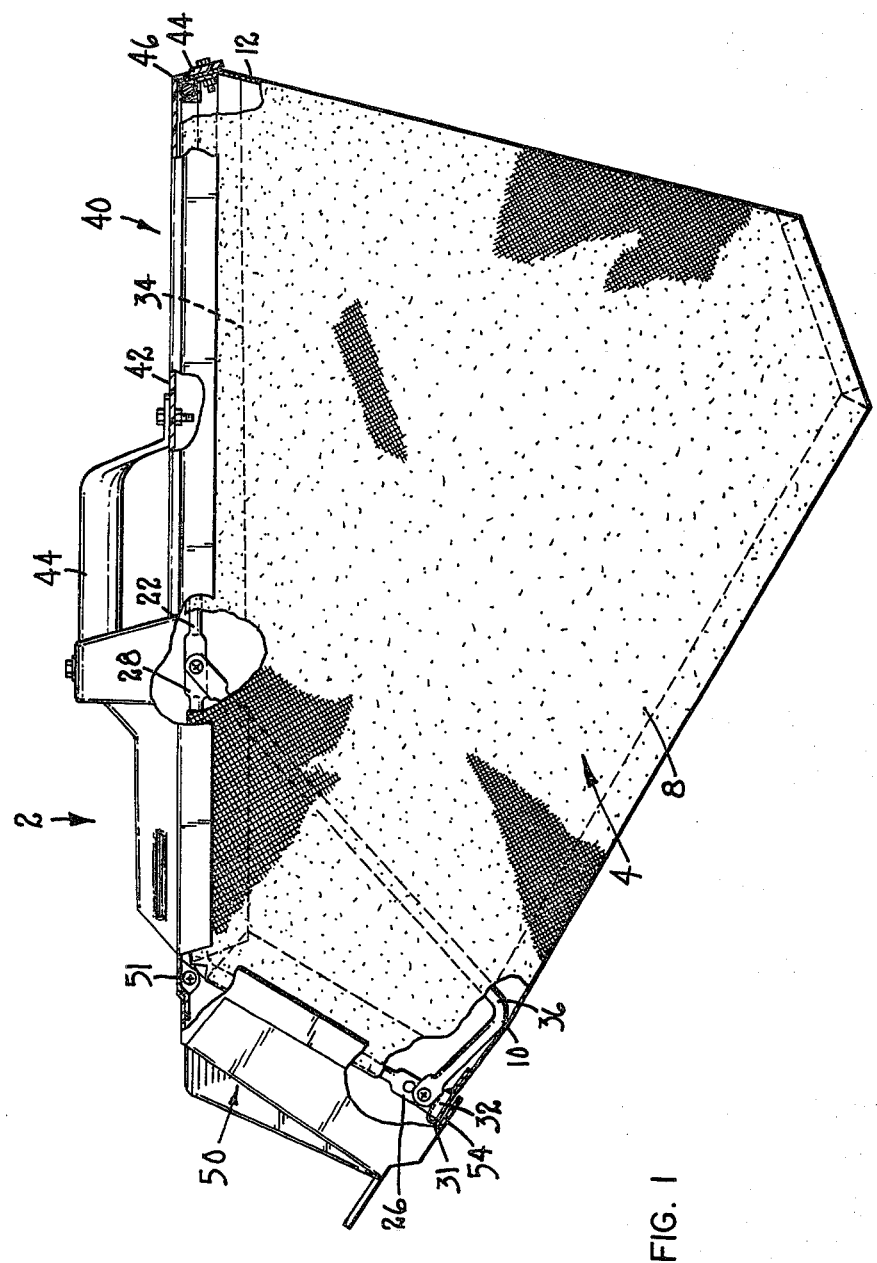
FIG. 1 is a side elevational view of an improved grass catcher assembly according to this invention.

Referring first to FIG. 1, an improved grass catcher assembly according to the present invention is generally identified as 2. Grass catcher assembly 2 is for use with any conventional lawn mower or the like for receiving and collecting the cut grass particles or other cut vegetation. The lawn mower with which grass catcher assembly 2 may be used does not form part of the present invention other than for the fact that it represents the piece of equipment to which grass catcher assembly 2 is connected. Therefore, the lawn mower will not be specifically illustrated herein. A verbal description of the lawn mower where necessary to understand the operation and function of grass catcher assembly 2 will be provided hereafter.

Grass catcher assembly 2 comprises a container into which the cut grass particles are placed. Preferably, this container is a flexible bag 4. Bag 4 is made from any fabric type material conventionally used for lawn mower bags. Such a material is preferably porous to air.

Figure 4:
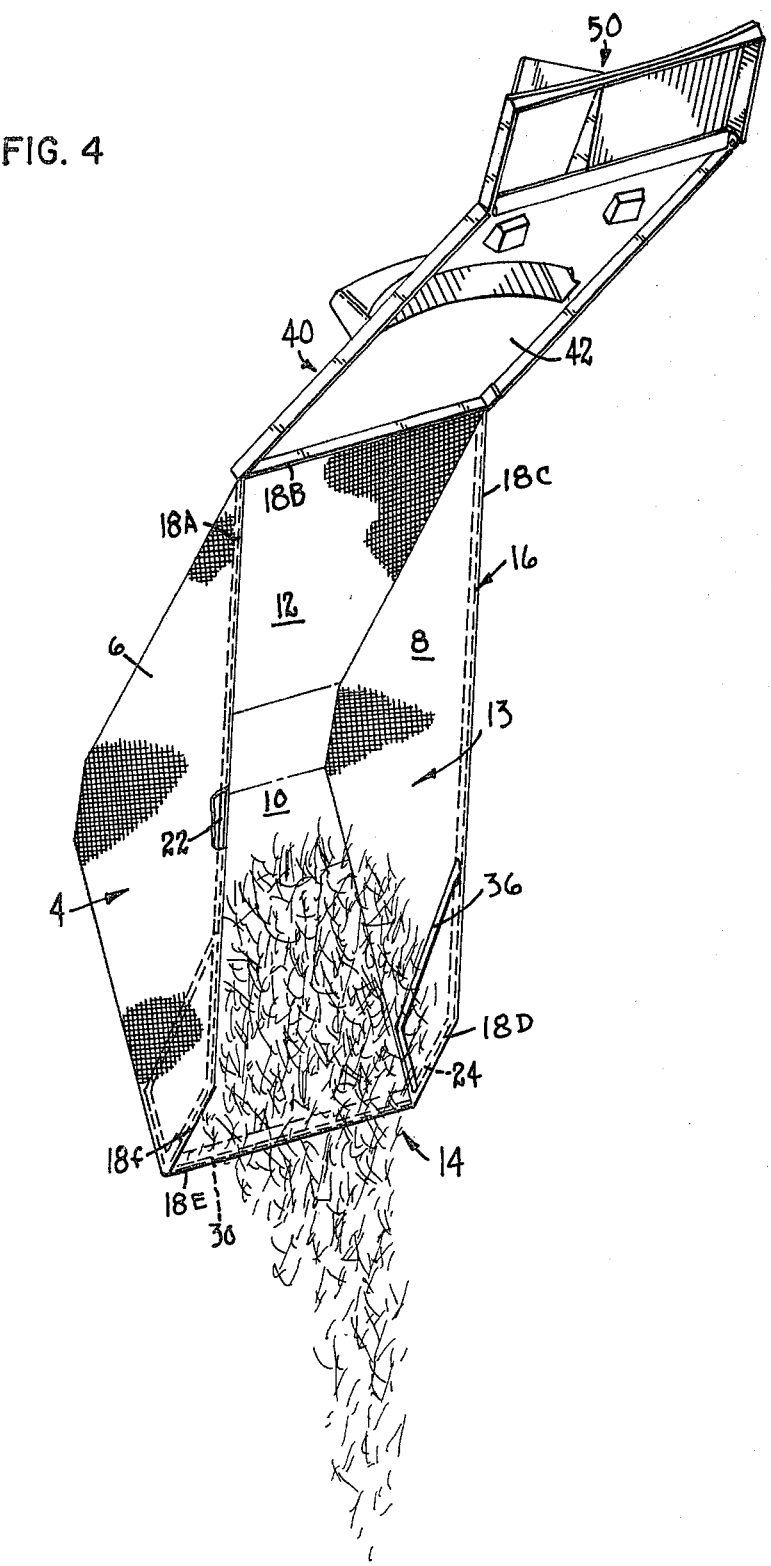
FIG. 4 is a perspective view similar to FIG. 3 showing the grass catcher assembly of FIG. 1, particularly illustrating the top cover of the bag pivoted upwardly for a grass dumping operation.

As shown particularly in FIGS. 1 and 4, bag 4 comprises spaced apart left and right side walls 6 and 8. Side walls 6 and 8 are connected together by a bottom wall 10 and a rear wall 12 to form an upwardly opening U-shaped trough 13. This trough 13 represents a volume into which the cut grass particles are placed. The front side 14 and the entire top side 16 of bag 4 are open. In addition, the cross-sectional area of bag 4 gradually increases from the front side 14 as one moves toward the rear wall 12. Thus, bag 4 gradually increases in size as one moves from front side 14 to rear wall 12.

The open front side 14 and open top side 16 are bounded by a plurality of peripheral edges 18 A-F. Edges 18 A-C surround open top side 16 and edges 18 D-F surround front side 14. A reinforcing means 20 is preferably contained in all the edges 18 A-F. The reinforcing means 20 includes a rigid U-shaped rod 22 which extends along the edges 18 A-C that bound the open top side 16. U-shaped rod 22 is formed with integral downwardly extending front arms 24. Arms 24 extend downwardly through the vertical peripheral edges 18 D and 18 F of front side 14. Front arms 24 terminate at their outer ends in flat portions 26. In addition, U-shaped rod 22 also has flat portions 28 formed in the longitudinal edges 18 A and 18 C of the top side 16.

The lower most horizontal peripheral edge 18 E along front side 14 has a rigid, flat bar 30 extending through a sewn pocket 31 in edge 18 E. Flat bar 30 is formed at either side with upwardly extending tabs 32. Tabs 32 are joined at either side by a threaded securing member, such as a bolt 33, to the flat portions 26 on front arms 24. U-shaped rod 22 and front arms 24 are also respectively received in sewn pockets 34 which extend along the other peripheral edges 18 A-D and 18 F. In addition, an L-shaped reinforcing rod 36 having one end secured to the flat portions 28 and the other end secured to the flat portion 26 is used on each side of bag 4. This tends to give further rigidity to the peripheral edges 18 A-E. Rod 22, bar 30 and rods 36 define a substantially rigid bag frame 38 used around the peripheral edges 18 A-E of the open top side 16 and front side 14. Bag 4 is flexible on this frame to accommodate movement of the mower or grass particles into the bag.

Assembly 2 includes a cover 40. Cover 40 is pivotally mounted on bag 4. Cover 40 comprises a substantially flat top wall 42 having a handle 44. Top wall 42 includes at the rear a downwardly depending flange 44. A flexible pocket 46 is secured to flange 44. Pocket 46 is received around that portion of U-shaped rod 22 which runs along peripheral edge 18 B. This portion of rod 22 in conjunction with pocket 46 forms a pivot axis for cover 40. Thus, cover 40 is pivotally mounted to the bag 4 adjacent rear wall 12 thereof. This placement of the pivot axis is important to one aspect of this invention as will be explained hereafter.

A substantially rigid chute or door 50 is pivotally secured by pivot pins 51 or the like to the front of top wall 42 of cover 40 and extends downwardly therefrom. Chute 50 defines interalia a means by which bag 4 is releasably coupled to the housing of the lawn mower. Preferably, the housing of the lawn mower has a U-shaped recess or seat in which the rigid chute 50 can be clamped by a spring-loaded flap. Spring-loaded flap when raised up would bear against a bearing area 49 on the top wall 42 of cover 40 to force the entire grass catcher assembly 2 into engagement with the recess on the lawn mower housing. Such a type of releasable mounting means is described in a copending U.S. patent application, Ser. No. 44,168, filed May 31, 1979 which is assigned to the assignee of the present invention. However, any type of releasable mounting means could be used to support assembly 2 on the lawn mower housing as long as the chute 50 is generally adjacent the grass discharge port of the housing.

Chute 50 includes a rectangular inlet aperture 52. Inlet aperture 52 is placed in a mating face-to-face relationship with the grass discharge port on the lawn mower housing when grass catcher assembly 2 is mounted thereon. The cut grass particles travelling through the lawn mower housing will be projected through the inlet aperture 52 and into the interior of the bag 4 through the open front side 14 of bag 4. While inlet aperture 52 is shown as being somewhat less in area than the total front vertical wall of 54 chute 50, the entire front wall 54 of chute 50 could be totally open to constitute a larger inlet opening 52 if so desired.

Chute 50 includes along the bottom a rearwardly extending lip 54. Lip 54 is configured to frictionally engage the metal bar 30 that runs across the lowermost peripheral edge 18 E bounding front side 14. Thus, cover 10 is frictionally engaged on the bag frame 38. The components of cover 40 are preferably made of a substantially rigid material, such as plastic. Thus, a portion of grass catcher assembly 2 is relatively rigid, i.e. cover 40, while bag 4 is itself made from a flexible material. Preferably, cover 40 is imperforate to the passage of air.

Referring now to the operation of grass catcher assembly 2, assembly 2 is mounted on the housing of the lawn mower such that during the operation thereof the cut grass particles are projected into the interior of bag 4. When assembly 2 is mounted on the lawn mower, the bottom wall 10 of the bag 4 will be approximately horizontal with the top side 16 sloping upwardly. This is shown in FIG. 3. In any event, during operation bag 4 will eventually become filled with grass. It is then necessary to dump the cut grass particles from assembly 2 to allow further operation of the lawn mower.

The dumping operation occurs after the assembly 2 is removed from the lawn mower housing. After this has been done, the operator then grasps chute 50 and pulls it outwardly until lip 54 disengages the bag frame 38. Once this frictional engagement has been broken, cover 40 is pivoted upwardly to the position shown in FIG. 3. Assembly 2 can then be tilted or tipped forwardly causing the cut grass particles to fall outwardly through both the open front side 14 and the open top side 16 of bag 4. After the grass has been removed from bag 4, cover 40 is then pivoted to its closed position shown in FIG. 3 and pushed inwardly until frictional engagement occurs between chute 50 and bag frame 38. Assembly 2 can then be remounted on the lawn mower for reuse.

One advantage of this invention is the fact that grass is now dumped through an opening which is much larger than the normal inlet opening into a bag of this type. That area is defined by both the open front side 14 and open top side 16 and not by the open front side 14 alone. In addition, because cover 40 is pivoted adjacent rear wall 12 of bag 4, the grass can be simultaneously dumped through both the front and the top sides 14 and 16 when bag 4 is tilted forwardly. This is an improvement over prior art clamshell type receptacles which pivot at the front since then the grass can be dumped only through the open top side. While front side 14 may be relatively small, the ability to dump the grass particles through this area is still desirable and speeds the grass dumping operation.

In addition, grass catcher assembly 2 of this invention is advantageous because of the frictional engagement between chute 50 and bag frame 38. Such a frictional engagement negates the need for a separate positive type of latch or locking means. Since a component has been done away with which would otherwise have been necessary, assembly 2 should be less expensive to manufacture.

One alternative to the grass catcher assembly 2 shown herein is the use of a cover 40 which would cover only the top side 16 of bag 4 leaving front side 14 unobstructed. Chute 50 could be dispensed with in this embodiment. Such an alternative embodiment would be somewhat less complex and less expensive to manufacture. In addition, a frictional engagement of the remaining portion of cover 40 could be effected with U-shaped rod 22 if so desired.

Various other modifications of this invention will be apparent to those skilled in the art. For example, any type of hinge or pivot means could be used to pivot cover 40 on rod 22. Thus, the scope of this invention is to be limited only by the appended claims and not the foregoing description which sets forth only an illustrative embodiment of the invention.

I claim:

1. A grass catcher assembly for use on a lawn mower or the like for receiving cut vegetation particles, which comprises:
   (a) a substantially flexible bag which is enclosed except for an open front side and a generally contiguous open top side each of which is bounded by peripheral edges, wherein the front side of the bag defines an inlet through which the cut vegetation particles pass into the bag, and wherein the bag includes a rear wall which is spaced from and generally opposed to the front side of the bag;
   (b) means for reinforcing the peripheral edges which bound the open front and top sides of the bag;
   (c) a cover for enclosing at least the open top side of the bag;
   (d) means for pivotally mounting the cover to the bag adjacent the rear wall thereof such that the cover can be pivoted from a first position in which the cover closes the open top side of the bag to a second position in which the cover is pivoted upwardly in a clamshell manner, whereby the cut vegetation particles may be emptied through both the front and top sides of the bag when the bag is tilted forwardly toward the front side; and
   (e) wherein the cover also includes a downwardly depending chute which is configured to cover and close the open front side of the bag when the cover is in its first position, wherein the chute includes a means for co-acting with the lawn mower to support the bag thereon, and wherein the chute includes an inlet aperture for allowing the cut vegetation particles to be thrown through the chute and into the front side of the bag.

2. A grass-catcher assembly as recited in claim 1, wherein the chute has a frictional fit with the reinforcing means along at least some of the peripheral edges bounding the open front side to releasably retain the cover in its first position.

3. A grass catcher assembly as recited in claims 1 or 3, wherein the bag is made from a fabric type material which is porous to air and the cover is made from a material which is not porous to air.

4. A grass catcher assembly as recited in claim 3, wherein the cross-sectional area of the bag gradually increases from the front side of the bag towards the rear wall thereof.

5. A grass catcher assembly for use on a lawn mower or the like for receiving cut vegetation particles, which comprises:
   (a) a container which is enclosed except for an open front side and a generally contiguous open top side each of which is bounded by peripheral edges, wherein the front side of the container defines an inlet through which the cut vegetation particles pass into the container, and wherein the container includes a rear wall which is spaced from and generally opposed to the front side of the container;
   (b) a cover for enclosing the open top side of the container, wherein the cover includes a downwardly depending chute which is configured to cover and close the open front side of the bag when the cover is in a first position, and wherein the chute includes an inlet aperture for allowing the cut vegetation particles to be thrown through the chute and into the front side of the bag;
   (c) means for pivotally mounting the cover to the container adjacent the rear wall thereof such that the cover can be pivoted from the first position in which the cover closes the open top side and the chute closes the open front side of the container to a second position in which the cover is pivoted upwardly in a clamshell manner from the container, whereby the cut vegetation particles may be emptied through both the front and top sides of the container when the container is tilted forwardly toward the front side; and
   (d) means for frictionally engaging the chute to the container such that the cover can be disengaged for movement to its second position by pulling the chute away from the container.

* * * * *